United States Patent [19]

Kuhnsman et al.

[11] Patent Number: 4,513,692
[45] Date of Patent: Apr. 30, 1985

[54] ILLUMINATABLE PET LEASH

[75] Inventors: Alexandra Kuhnsman, Oxford; Marian B. Morey, Somerville, both of N.J.

[73] Assignee: Alexandra Enterpises, Inc., Oxford, N.J.

[21] Appl. No.: 605,197

[22] Filed: Apr. 30, 1984

[51] Int. Cl.³ .......................... A01K 27/00; A45B 3/04
[52] U.S. Cl. ..................................... 119/109; 362/102
[58] Field of Search ............... 119/109, 106; 362/102, 362/109, 202, 399, 32; 446/465, 47; 40/547

[56] References Cited

U.S. PATENT DOCUMENTS

| 2,642,519 | 6/1953 | Caustin et al. | 362/102 |
| 3,707,055 | 12/1972 | Pearce | 446/485 |
| 3,964,441 | 6/1976 | Wall | 119/109 |
| 4,208,701 | 6/1980 | Schock | 362/102 |
| 4,369,486 | 1/1983 | Pool | 362/32 |

FOREIGN PATENT DOCUMENTS

| 490219 | 1/1930 | Fed. Rep. of Germany | 119/106 |
| 2276069 | 1/1976 | France | |
| 322091 | 7/1957 | Sweden | 362/102 |

Primary Examiner—Robert P. Swiatek
Assistant Examiner—Kris R. Schulze
Attorney, Agent, or Firm—Kenneth P. Glynn

[57] ABSTRACT

The present invention is an illuminatable pet leash device. It includes an elongated tube which is non-opaque and which is of sufficient length, strength and flexibility to be used as a pet leash, and a handle and a pet collar attachment mechanism, one each being connected to opposite ends of the tube. In addition, a set of battery operated illumination circuitry of the flashlight type is included, which is located within the handle. There is an on-off switch connected to the set of circuitry, and a light bulb connected to the set of circuitry and connectively positioned with respect to the handle so as to be capable of shining away from the handle and into the tube. Lastly, the device includes at least one bundle of optical fibers contained within the tube, positioned in the light path of the bulb so as to be capable of fiber optic illumination within the tube.

14 Claims, 4 Drawing Figures

ILLUMINATABLE PET LEASH

BACKGROUND OF THE INVENTION

1. Field of the Invention

The present invention is directed to a novel pet leash, and more particularly to an illuminatable pet leash. The present invention device is specifically a plastic type of leash which utilizes fiber optics for illumination.

2. Prior Art Statement

The art is replete with novel dog and cat leashes and collars having bells, noisemakers, reflectors and other features which enhance the entertainment value or the safety value for pets and pet owners. Notwithstanding the formidable collection of general prior art relating to pet leashes, no patent is known to the inventors herein which would be directed to the illumination of leashes. French Pat. No. 2,276,069 to Maurice Fradin teaches an illuminated jump rope which relies upon a plurality of strings of bulbs running through a tube and relies upon complex mechanical and electrical arrangements. However, this French Patent describes a jump rope with handles which operate longitudinally at right angles to the length of the tube containing the strings of lights. This necessitates a "yoke" or "axle" arrangement for each handle whereby the yoke is connected to the tube and must rotate 360° around the handle for each jump. Further, French Pat. No. 2,276,069 also requires circuitry connected by sliding ring tracks which may eventually malfunction due to spring failure, mechanical wear or other failure. Additionally, this French Patent teaches the use of many light bulbs in strings, which may blow out, short or wear out.

The present invention, however, relies upon fiber optics, has no string of bulbs, has no moving parts which rotate continuously, etc. Further, the present invention is directed to an illuminatable pet leash and not a jump rope, the respective arts being non-analogous. For these reasons, it is urged that the present invention is neither taught nor rendered obvious by French Pat. No. 2,276,069.

SUMMARY OF THE INVENTION

A novel, illuminatable pet leash is described which includes a handle and an elongated tube connected thereto at one end and a pet collar attachment mechanism connected thereto at the opposite end. The handle contains battery operated flashlight type circuitry with an on-off switch, and a bulb is connected to the circuit. A bundle of optical fibers extends into the hollow tube away from the bulb. When the handle contains batteries and is turned on, light shines away from the handle into the fiber bundle so as to illuminate the hollow tube, preferably throughout entire length of the tube.

BRIEF DESCRIPTION OF THE DRAWINGS

Various other objects, features and attendant advantages of the present invention will be more fully appreciated as the same becomes better understood from the following detailed description in connection with the accompanying drawings, in which like reference characters designate like or corresponding parts through several views and wherein.

DETAILED DESCRIPTION OF THE PRESENT INVENTION

Figure 1:
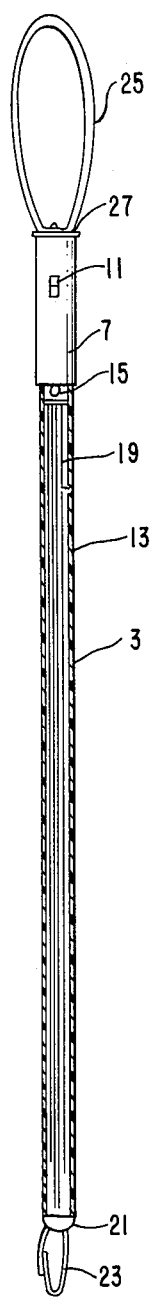
FIG. 1 is a frontal view of one preferred embodiment of the present invention device.

Referring now more particularly to the Figures, a present invention illuminatable pet leash is shown in FIG. 1. A hollow elongated tube 3 is shown which is non-opaque. Tube 3 may be either translucent or transparent but is preferably transparent and is of sufficient length, strength and flexibility so as to be used for a pet leash, e.g. for a dog, cat, monkey or other pet. In this specific embodiment, tube 3 is made of clear Tygon tubing of about one-half to about three-quarters of an inch in diameter (Tygon tubing is a trade name product sold by Norton Specialty Plastics Division, Akron, Ohio). It may be made of other similar material and may have a circular cross-section, an oval cross-section or otherwise, as a matter of design.

Handle 7 is shown wherein it is connected to one end of tube 3. Handle 7 has strap 25 attached to its other end by any known means. Strap 25 may be leather, plastic, woven or other material, as a matter of design. Handle 7 contains battery operated illumination circuitry of the flashlight type which is shown in more detail and discussed in conjunction with FIG. 3 below. On-off switch 11 is shown on the side of handle 7. On-off switch 11 is operatively connected to the mentioned circuitry contained within the handle. Light bulb 15 is likewise connected to the mentioned circuitry and is positioned so as to shine away from the handle and into hollow tube 3. While bulb 15 is shown for illustrative purposes as extending beyond handle 7, it may be recessed within handle 7, and in one preferred embodiment, is so recessed. Optional screw-off cap 27 facilitates insertion, removal and replacement of batteries.

In FIG. 1, the bundle of optical fibers 19 is contained within tube 3 and positioned within the light path of bulb 15, as shown. Bundle 19 contains optical fibers of varying length as shown, the longest of which are approximately the full length of tube 3. Bundle 19 contains at least 40 to 60 optical fibers or more so as to create fiber optics illumination points throughout the entire tube 3. As a practical matter, the bundle may be glued, force fitted or otherwise held together by any conventional means in the area of bulb 15 and may optionally include a directing lens such as is frequently used in flashlights and may optionally include a color filter disc of one or more colors to create colored light points within hollow tube 3.

Figure 2:
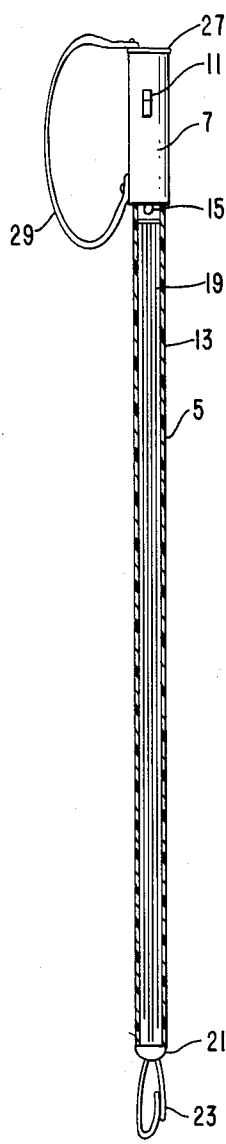
FIG. 2 shows a frontal view of another preferred embodiment of the present invention.

FIG. 2 shows an alternative embodiment to that shown in FIG. 1. Like parts to FIG. 1 are like numbered in FIG. 2. Note, however, that outer sheath 5 is shown instead of tube 3. Sheath 5 constitutes an extrusion molded elongated piece having optical fibers embedded therein at the time of its formation in lieu of insertion into premolded tube 3. Also, strap 29 is affixed to handle 7 in a side manner as shown instead of the end attachment shown in FIG. 1.

Figure 3:
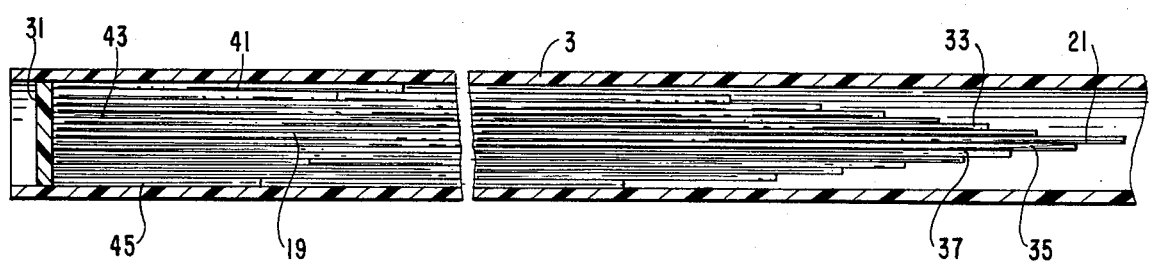
FIG. 3 shows a cut view of a section of hollow tube used in an embodiment of the present invention; and, FIG. 4 illustrates a side cut view of another embodiment of a handle for a device of the present invention.

FIG. 3 shows a cut view of a section of hollow tube 3 used in one embodiment of the present invention. As shown, hollow tube 3 contains fiber bundle 19 and optional color disc 31. Longest fiber 21 is shown to be approximately coaxial with the central axis of tube 3 and longer fibers 33, 35, 37 and the like are bundled contiguously to longest fiber 21, whereas shorter fibers 41, 43, 45 and the like are bundled around and outside of the longer fibers.

Figure 4:
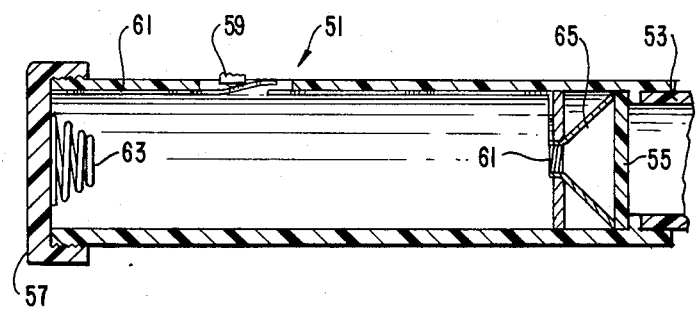

FIG. 4 shows a cut view of a handle used in one preferred embodiment of the present invention. Handle 51 is shown with a section of hollow tube 53 bonded thereto. As shown, handle 51 is cylindrical, and it contains an optional bulb magnifying lens 55 at the end of the handle 51 which enters tube 53, and it contains an optional screw-off cap 57 at the opposite end. (For simplicity, a strap is not shown and may be attached by any conventional method, e.g. rivets.) Handle 51 also contains on-off switch 59 and battery operated flashlight type circuitry 61. The circuitry includes coil spring terminal 63 and is connected to bulb holder 65. When a bulb is screwed into the socket 67 of holder 65 and batteries are inserted, the circuit is opened and closed for operation via switch 59.

In general, all parts except for the conductive circuitry and glass lens may be constructed of plastic, including the hollow tube. Further, while it is preferred to allow for battery replacement and even bulb replacement in actual design, one embodiment consists of permanently enclosing long life batteries and bulb.

Obviously, numerous modifications and variations of the present invention are possible in light of the above teachings. It is therefore to be understood that within the scope of the appended claims, the invention may be practiced otherwise than as specifically described herein.

What is claimed is:

1. A flexible illuminatable pet leash device which comprises:
   (a) an elongated tube which is non-opaque and which is of sufficient length, strength and flexibility to be used as a pet leash;
   (b) a handle which is connected to one end of said tube;
   (c) a pet collar attachment mechanism connected to the end of said tube opposite said handle;
   (d) a set of battery operated illumination circuitry of the flashlight type, being located within said handle;
   (e) an on-off switch, being connected to said set of circuitry;
   (f) a light bulb, being connected to said set of circuitry and being connectively positioned with respect to said handle so as to be capable of shining away from said handle and into said tube; and,
   (g) at least one bundle of optical fibers contained within said tube, said bundle being positioned in the light path of said bulb so as to be capable of fiber optic illumination within said tube, said bundle being of varied lengths of optical fibers, the longest of which is approximately the tube length, the total number of optical fibers within all of said bundles being at least forty in number.

2. The device of claim 1 wherein said tube is transparent.

3. The device of claim 2 wherein at least one color filter is positioned between said bulb and a fiber bundle so as to be capable of colored light fiber optics illumination.

4. The device of claim 3 wherein said handle includes a spring loaded screw-off end to facilitate insertion and removal of batteries.

5. The device of claim 2 wherein said handle includes a spring loaded screw-off end to facilitate insertion and removal of batteries.

6. The device of claim 1 wherein said tube is translucent.

7. The device of claim 6 wherein at least one color filter is positioned between said bulb and a fiber bundle so as to be capable of colored light fiber optics illumination.

8. The device of claim 7 wherein said handle includes a spring loaded screw-off end to facilitate insertion and removal of batteries.

9. The device of claim 6 wherein said handle includes a spring loaded screw-off end to facilitate insertion and removal of batteries.

10. The device of claim 1 wherein at least one color filter is positioned between said bulb and a fiber bundle so as to be capable of colored light fiber optics illumination.

11. The device of claim 10 wherein said handle includes a spring loaded screw-off end to facilitate insertion and removal of batteries.

12. The device of claim 1 wherein said handle includes a spring loaded screw-off end to facilitate insertion and removal of batteries.

13. The device of claim 1 wherein said tube is hollow.

14. The device of claim 1 wherein said tube is extruded in place about said bundle of fibers.

* * * * *